D. C. DRILL.
TRANSMISSION AND STEERING MECHANISM FOR FARM TRACTORS.
APPLICATION FILED SEPT. 22, 1919.
1,395,668.
Patented Nov. 1, 1921.
3 SHEETS—SHEET 2.
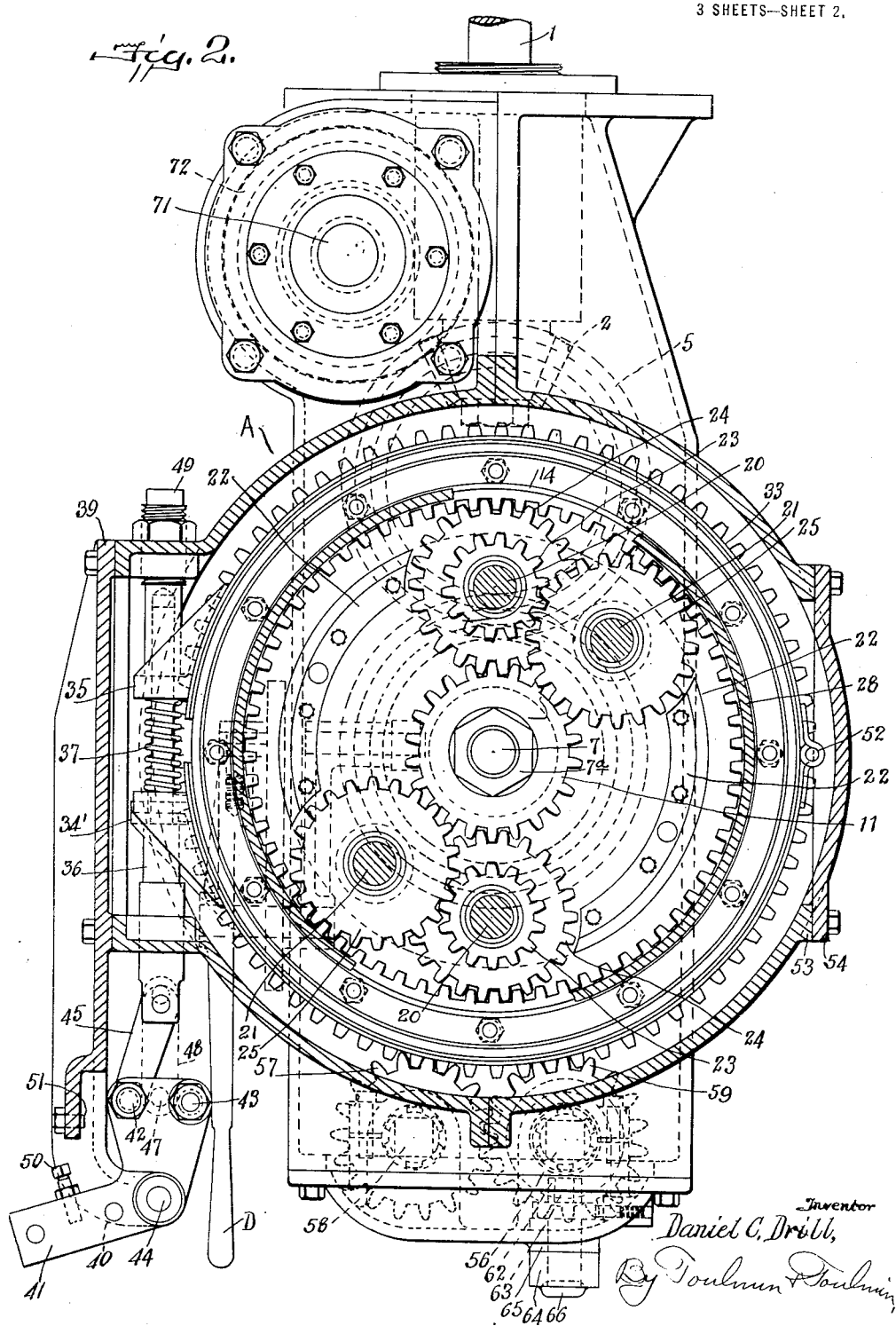
Inventor
Daniel C. Drill,
By Toulmin & Toulmin
Attorneys

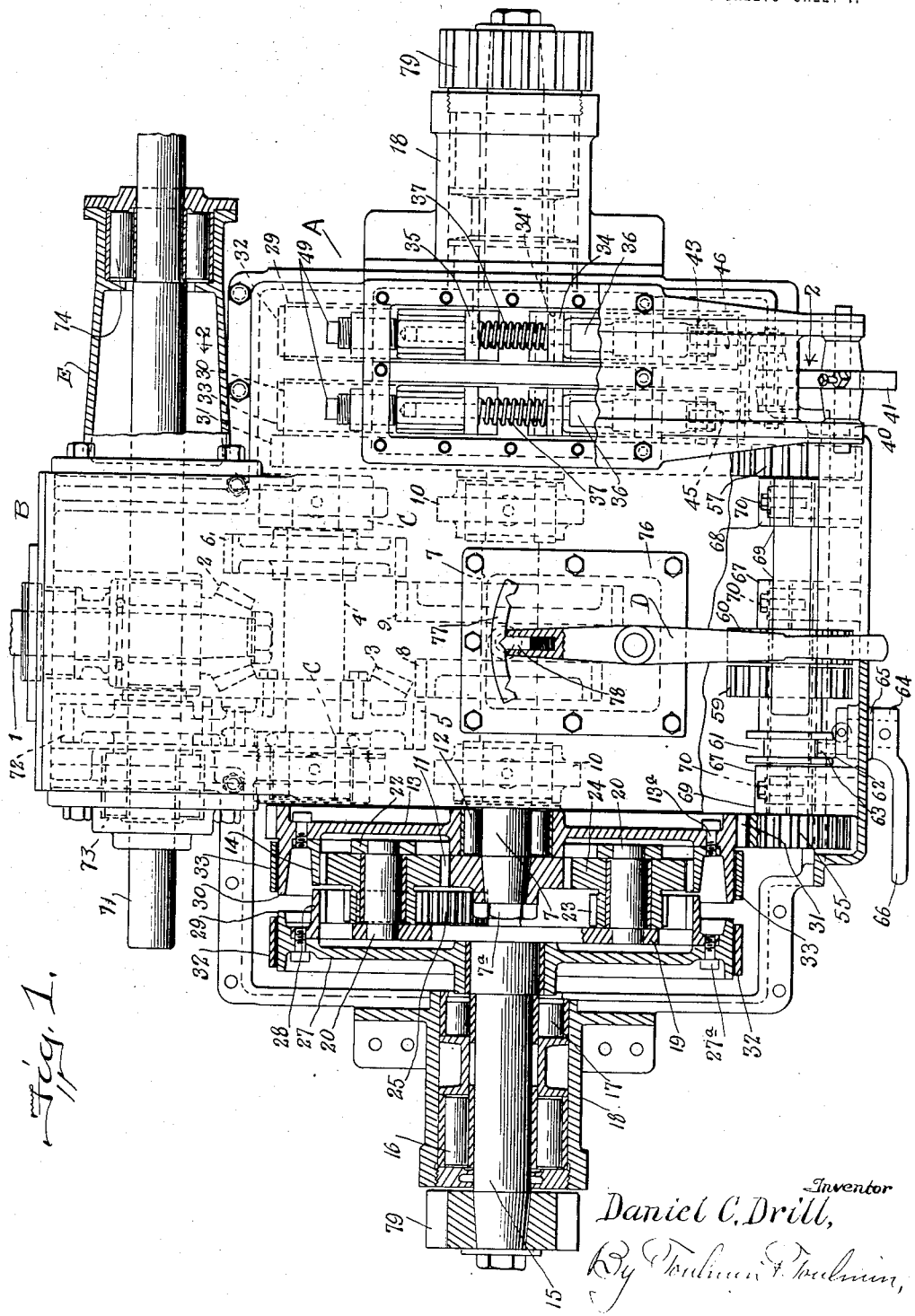

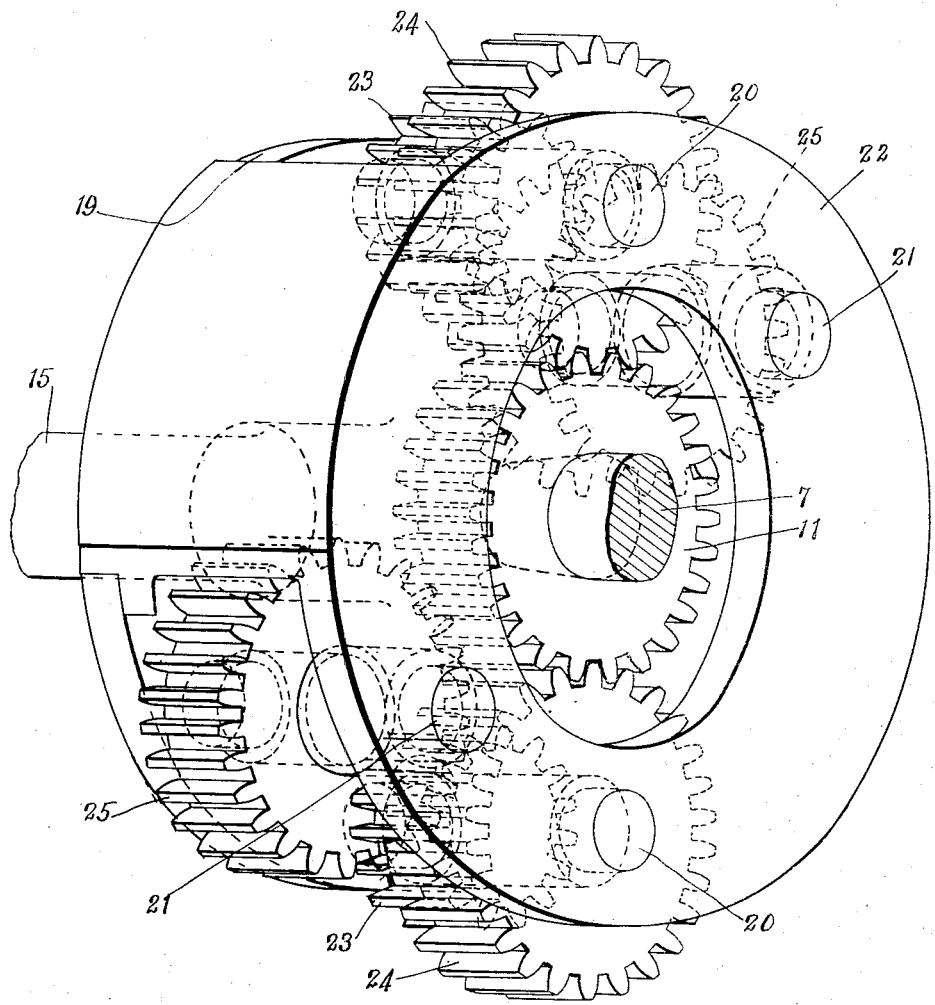

UNITED STATES PATENT OFFICE.

DANIEL C. DRILL, OF GREENVILLE, OHIO.

TRANSMISSION AND STEERING MECHANISM FOR FARM-TRACTORS.

1,395,668.   Specification of Letters Patent.   Patented Nov. 1, 1921.

Application filed September 22, 1919. Serial No. 325,493.

*To all whom it may concern:*

Be it known that I, DANIEL C. DRILL, a citizen of the United States, residing at Greenville, in the county of Darke and State of Ohio, have invented certain new and useful Improvements in Transmission and Steering Mechanism for Farm-Tractors, of which the following is a specification, reference being had therein to the accompanying drawing.

This invention relates to improvements in transmission and steering mechanism for farm tractors and has for its main purpose to provide a construction which will enable the tractor to be turned in much less time and in relatively smaller space than is possible with tractors constructed according to common practice.

To accomplish the purposes of the invention the motor is connected to the drive wheels of the tractor by improved transmission gearing in such a manner that one or the other of the tractor wheels or both tractor wheels may be disconnected from the transmission mechanism at the will of the operator, the power being transmitted from the motor to the drive wheels through a system of planetary and differential gearing which provides the tractor with the maximum of mobility, that is to say, the tractor may be maneuvered to the greatest advantage with respect to time and space required for its turning movements.

Other features of my invention will be apparent from the herein detailed description of the invention and the illustration of the drawings. Structurally considered the device embodying the invention is of simple substantial construction, in all respects well designed to meet the requirements of tractor transmission gearing and the purposes of the present invention.

In the accompanying drawings,

Figure 1 is a plan view, partly in section and having the upper gear casing removed, of transmission gearing embodying my invention;

Fig. 2 is a side elevation of the improved gearing taken on the line 2—2 of Fig. 1;

Fig. 3 is a detail view of one unit of the planetary gearing shown in Figs. 1 and 2, without the brake drum.

As here shown my invention is assembled in a gear casing A which may be of any construction suitable to the requirements of the invention.

Supported in suitable bearings B—B in the forward end of the housing A is a longitudinal drive shaft 1 which connects the motor to the transmission gearing and drive wheels of the tractor, the drive shaft being connected to the motor by means of any suitable clutch (not shown). Secured to the opposite end of the drive shaft 1 is a bevel gear 2 meshing with a bevel gear 3 on a transverse shaft 4 supported in bearings C—C of the gear housing A, and having secured thereto two opposite gears 5 and 6 of unequal size.

Supported in the central portion of the gear housing A in suitable bearings 10 is a second transverse shaft 7 which has splined thereto two opposite gears 8 and 9 of unequal diameter and adapted to mesh respectively with the gears 5 and 6, the operation of which will presently be described.

Also secured to the shaft 7 at the opposite ends thereof by means of nuts 7ª are gears 11 and between the bearings 10 and gears 11 and mounted in bearings 12 are annular disks 13 to which are bolted on the outward faces thereof internal gears 14.

Secured in the laterally extending housings 18 of the gear casing A, in suitable bearings 16—17, are butt-shafts 15 which are substantially in alinement with the shaft 7, and have secured to their inner ends annular flanges 19 which have suitable apertures therein to receive one end of studs or butt-shafts 20 and 21, the opposite ends of the shafts 20—21 being supported in ring brackets 22 which are bolted to the flanges 19 in any suitable manner, thus forming a space between the flanges and the ring brackets across which the shafts 20 and 21 extend transversely.

On the shafts 20 are mounted integral gears 23 and 24 which are of unequal diameter, and on the shafts 21 are mounted single gears 25, there being two each of the gears 23 and 24 and 25 used in each of the opposite sets of planetary gearing, the gears of each set being arranged diametrically opposite each other, the gears 23 and 25 being substantially in the same vertical plane and thus adapted to mesh one with the other, and the gears 24 being in the plane of the gears 11 and meshing therewith.

The shafts 15 also support on their inner ends disks 27 to which are secured by means of screws 27ᵃ internal gears 28; the disks being further provided, preferably cast integrally therewith, with flanges or rims 29, the disks 13 being provided with a similar rim 30 which serve respectively as brake bands for the disks 13 and 27 which function one with the other relative to the planetary gearing carried thereby, as will presently be described.

The disks 13 are further provided with external gears 31 adapted to mesh with gears 55 and 57, respectively, of a differential gearing device which is preferably used in coöperation with the planetary transmission gearing. The gear 55 is mounted on a shaft 56 preferably by squaring the end of the shaft, as shown in Fig. 2 of the drawings, and the gear 57 is mounted in like manner on a shaft 58. An intermediate gear 59 is also mounted upon the shaft 56, being splined thereto to permit of longitudinal movement thereof relative to the shaft; and an intermediate gear 60 is fixed to the inner end of the shaft 58, the coöperating gears 59 and 60 being adapted to mesh one with the other accordingly as the gear 59 may be moved relative to the shaft 56. For operation of the gear 59 the same is provided with an extended hub having a groove 61 formed therein. Coöperating with the groove is a block 62 and a crank pin 63 secured to a crank shaft 64 supported in a bearing 65 in the casing A and operable by means of a lever 66. Thus by operating the lever 66 the gear 59 may be moved into and out of mesh with the gear 60 for a purpose which will presently be described.

With the foregoing detailed explanation relative to the construction of transmission gearing embodying my invention the operation and result of operation thereof will be readily understood by those skilled in this art. Briefly stated the operation is as follows:—

The tractor has two forward speeds as determined by shifting the gears 8 and 9 to cause one or the other to mesh with its respective coöperating gear 5 or 6, the shifting of the gears being accomplished by a gear shift lever D mounted in a suitable housing 76 secured to the main gear casing A, and having three positions, namely, low, high and neutral, the lever being alined in the respective positions by means of a ratchet or detent plate 77 coöperating with a spring plunger 78 of the shifting lever. Thus by moving the lever to the left of the center or neutral position, the gear 9 is caused to mesh with the gear 6, and by moving the lever to right of center the gear 8 is caused to mesh with the gear 5, thereby adjusting the transmission mechanism to low or high gear, respectively.

On either of the forward speeds the gears 11 are driven, though the medium of the drive shaft 1, bevel gears 2—3, one or the other of gears 5—8 or 6—9, and transverse shaft 7, in counter-clockwise direction as shown in Fig. 2 of the drawings. The integral gears 23—24, meshing with the gears 11, therefore, are driven in the opposite direction, and the gears 25 which mesh with the gears 23 are driven in the same direction as the gears 11. The internal gears 14 meshing with the gears 24 are driven in the same direction as the gears 24, therefore in the opposite direction to the gears 11, and the internal gears 28 meshing with the gears 25 are driven in the same direction as the gears 25 and, therefore, in the same direction as the gears 11.

It will be apparent, therefore, that if the internal gears 14 be held stationary and the gears 11 rotated in the direction indicated, the gears 24 will be rotated in the direction indicated and will also be caused to revolve in a planetary path in the same direction as the gear 11 rotates; also the gears 24 being connected to the flange disks 19 by means of ring brackets 22 and butt shafts 20 the disks together with the shaft 15 will be rotated in the direction of the planetary movement of the gears 24 and, therefore, in the same direction as the gear 11 but at a lower speed, the ratio of speed being determined by the gear ratio between the gears 11 and 14. In this relation and operation of the gears the disks 29, through the medium of the gears 23, 25 and the internal gears 28 will be rotated idly upon the shaft 15 in the same direction as the gear 11.

In like manner, if the gears 28 be held stationary and the gears 11 are rotated in the direction indicated, the gears 14 being permitted to rotate idly upon the shaft 7, the gears 25 will be rotated in the same direction as the gears 11 but will be caused to revolve around the internal gear 28 in the opposite direction, thus causing the shafts 15 to be rotated in the direction opposite to the direction of rotation of the gear 11 and at a relatively lower speed as determined by the gear ratios of the gears 11, 23 and 28.

The shafts 15 are provided at their outer ends with gears 79 which are adapted to mesh with suitable gears carried by the tractor drive wheels (not shown). And in order to control the operation of the internal gears 14 and 28 relative to the planetary gears 24 and 25 the flange portions 29 and 30 of the respective gears constitute brake drums having coöperating therewith, as best shown in Figs. 2 and 3, brake bands 32 and 33. The brake bands may be provided with any suitable adjusting mechanism, such as here shown, consisting of the band heads 34 and 35, and adjustable push rods 36, compensating springs 37 being interposed between the upper and lower band heads 34 and 35. The upper portion of the main gear casing A is provided with cover plates 39 which have rearwardly extending portions 40 forming a fulcrum for a suitable brake lever which may be attached to the lever shank 41. The parts 41 are provided with studs 42 and 43 which are arranged radially to the fulcrum center 44, and are connected respectively to the push rods 36 by toggle links 45 and 46.

When the brake lever is adjusted to the position shown in Fig. 2, both the brake bands are slacked and the opposite brake drums 29 and 30, together with internal gears 14 and 28 are free to revolve with the rotation of the gears 11. However, with the operation of the brake lever in either direction from the position one or the other of the brake bands will be drawn taut by a powerful gripping action to the corresponding brake drum, the limit stops 50 and 51 acting to prevent excessive movement of the brake lever in either direction. The brake bands are made preferably in two parts hinged together, as shown, by means of hinge pins 52. The lower part of the gear casing is also provided as here shown with a removable plate 54 whereby the brake band joints are rendered readily accessible. By removing the plate the pins 52 may be withdrawn and the opposite sections of the brake bands thus released, their forward ends being released by withdrawal of the push rods 36 may be removed from the gear casing through the opening in the gear casing covered by the plate 39.

From the foregoing detailed description it will be understood that a tractor equipped with my improved transmission gearing may have as here shown two speeds forward and reverse and that the rate of speed at which the tractor is to be operated may be effected at will by operating the gear shift lever, and the direction of travel of the tractor may be effected at will by manipulation of the brake levers.

It will also be apparent, in view of the plural planetary gear units of the transmission mechanism that either of the tractor drive wheels may have driving relation with the engine independently of the other, as well as both wheels having driving relation with the engine at the same time. While this provision in my invention is not novel in its functional effects, the means I have employed for accomplishing it are novel and possess important mechanical and operating advantages.

I also employ in connection with my improved planetary gear transmission, as herein described, a novel construction of differential gearing. This latter feature, however, is not essential to satisfactory operation of the tractor under all conditions, but under certain conditions which will be described, the differential gearing adds greatly to the mobility of the tractor, particularly, with respect to the time and space required for turning movements of the tractor. To this end the gears 31 which are formed integrally with the brake drum disks 13 and which in the direct forward or rearward movement of the tractor are driven in the same direction, are caused to mesh with the respective gears 55—57; thus, when the gear 59 is moved in mesh with the gear 60 the effect upon the transmission gearing will be the same as the effect produced by the operation of the brake lever relative to both the brake drums 30, except that there can be differential action of one set of planetary gears relative to the other as rotation in one direction of one of the gears 31 must result in rotation in the opposite direction of the other gear 31.

The advantages of the differential gearing functioning between the opposite units of the transmission gearing, in straightaway work, are, of course, obvious. By this arrangement the differential gearing will compensate between the transmission gear units for any variations of movement that may occur between the opposite drive wheels, such as will result on curves or deflections from a direct line of movement, the compensating effect of the differential being automatic without manipulation of the brakes of the planetary gear units.

The independent forward and reverse control of the opposite units of the transmission gearing permits in the turning movements of the tractor of driving one of the tractor wheels forward and the other in the reverse direction, thus effecting the turning movement within the length of the tractor wheel base, the center of the turning movement being substantially central of the wheel axis, thus effecting a right-angle turn, half-turn or full turn of the tractor without advance in any direction relative to the center of movement.

It will be obvious, of course, that instead of causing one of the wheels to move in inverse direction the same may be disconnected entirely from the transmission in the turning movement. Also it will be understood that the front wheels of the tractor will be made adaptable to the short turning operation contemplated by this feature of the invention.

It will also be apparent that the drive wheels may be utilized in view of their great range of independent and coöperative movements for steering the tractor, as the front wheels in the usual form of construction will readily respond to the movements of the driving wheels. This applies more especially, however, to the crawler types of tractors, in which the turning movement may be effected in either direction by releasing the brake lever on the side in the direction the turn is to be made. When the turn has been made to the desired extent the brake lever is again set and the tractor will move in a straight line as before.

There may also be conveniently provided in connection with my improved transmission gearing means for operating a belt pulley whereby the tractor motor may be utilized for operating other machinery. To this end a belt drive shaft 71 is mounted in suitable bearings 73 and 74 in the forward end of the main gear casing; the shaft being operated by means of a gear 72 secured thereto and meshing with the gear 5, and the bearing 74 being extended laterally by a suitable housing E so that the belt pulley secured thereto will clear the gear casing.

From the foregoing detailed description the construction, operation and results of operation of my improved transmission and differential gearing, and the important advantages realized therefrom will be readily comprehended and appreciated by those skilled in this art. The greater mobility of tractors, as well as the structural advantages realized by the invention are of fundamental importance in tractor development and construction, as improvements which effect increased mobility and at the same time provide structural advantages all tend toward more complete commercialization or adaptability of tractors to average farm conditions.

Having thus fully described my invention, what I claim as new and desire to secure by Letters Patent, is:—

1. In transmission gearing the combination, of an engine drive shaft, a plurality of shafts having driving relations with opposite drive wheels, a plurality of units of planetary transmission gearing interposed between the drive shaft and said opposite shafts, and mechanism for controlling each of said planetary gear units independently of the other, whereby power from said engine may be transmitted to cause said wheels to rotate in inverse directions relative to each other, and means connecting the opposite units of planetary transmission gearing to cause the units to rotate in unison.

2. In transmission gearing, the combination, of an engine drive shaft, a plurality of shafts having driving relation with opposite drive wheels, a plurality of units of planetary transmission gearing including a plurality of brake bands for each unit interposed between the drive shaft and said opposite shafts, and controlling mechanism for each of said units of planetary gearing whereby power may be transmitted to said drive wheels to actuate the same at a plurality of predetermined speeds either forwardly or backwardly simultaneously or *seriatim*, and means connecting the opposite units of planetary transmission gearing to cause the units to rotate in unison.

3. In transmission gearing, the combination, of an engine drive shaft, a plurality of shafts having driving relation with opposite drive wheels, a plurality of units of planetary transmission gearing interposed between the drive shaft and said opposite shafts, said gearing units including means for reversing the direction of rotation of the respective opposite shafts, a change speed gearing interposed between the drive shaft and the gearing units, and controlling mechanism for each of said units of planetary gearing and for said change speed gearing whereby power from said engine may be transmitted to said drive wheels to actuate the same in forward and reverse directions at a plurality of predetermined speeds simultaneously or *seriatim*, and means connecting the opposite units of planetary transmission gearing to cause the units to rotate in unison.

4. In transmission gearing, the combination, of an engine drive shaft, a plurality of shafts having driving relation with opposite drive wheels, a plurality of units of planetary transmission gearing interposed between the drive shaft and said opposite shafts, and a plurality of brake bands for each of said units of planetary gearing whereby power from said engine may be transmitted to said drive wheels, and differential gearing interposed between the opposite units of planetary gearing.

5. In transmission gearing, the combination, of an engine drive shaft, a plurality of shafts having driving relation with opposite drive wheels, a plurality of units of planetary transmission gearing interposed between the drive shaft and said opposite shafts, controlling mechanism for each of said units of planetary gearing whereby power from said engine may be transmitted to said drive wheels, and normally disconnected differential gearing interposed between the opposite units of planetary gearing and operable to cause said units to rotate in compensating relation to each other.

6. In transmission gearing, the combination, of an engine drive shaft, a plurality of shafts having driving relation with opposite drive wheels, a plurality of units of planetary transmission gearing interposed between the drive shaft and said opposite shafts, controlling mechanism for each of said units of planetary gearing whereby power from said engine may be transmitted to said drive wheels, and normally disconnected differential gearing interposed between the opposite units of planetary gearing and operable to cause said units to rotate in unison but in compensating relation to each other.

7. In transmission gearing the combination of an engine drive shaft, a plurality of shafts having driving relations with opposite drive shafts, a plurality of units of planetary transmission, gearing interposed between the engine drive shaft and said opposite shafts, gear shift mechanism between the engine drive shaft and said planetary units and a gear shift mechanism between the respective planetary units.

8. In transmission gearing, the combination, of an engine drive shaft, a plurality of shafts having driving relations with opposite drive wheels, an intermediate drive shaft, and a plurality of units of planetary transmission gearing interposed between said opposite shafts and the intermediate drive shaft, shiftable gear connections between the planetary units, and a controlling mechanism for the planetary gearing consisting of a plurality of shift gears of different values mounted on said intermediate shaft and adapted to be moved into operative relation with the engine drive shaft whereby said wheels may be operated at a plurality of predetermined speeds.

9. In transmission gearing, the combination, of an engine drive shaft, a plurality of shafts having driving relations with opposite drive wheels, a plurality of units of planetary transmission gearing interposed between the drive shaft and said opposite shafts, controlling mechanism for each of said units of planetary gearing whereby power from said engine may be transmitted to said drive wheels, and normally neutral differential gearing having gear relations with said opposite units of planetary gearing and having a shift gear operable to bring the differential gearing in train between said planetary gear units whereby said units will be caused to rotate in compensating relation to each other.

10. In transmission gearing, the combination of a drive pinion, a plurality of wheeled drive shafts driven therefrom, a plurality of units of planetary transmission gearing including a plurality of brake bands for each unit interposed between the drive pinion and said drive shafts, a casing inclosed in said mechanism and controlling mechanism for each of said brake bands whereby power from said drive pinion may be transmitted to said drive wheel, and means connecting the opposite units of planetary transmission gearing to cause the units to rotate in unison.

11. In transmission gearing the combination of a plurality of machine wheel drive shafts, a plurality of units of planetary transmission gearing including a plurality of brake bands for each unit interposed between the engine drive shaft and said wheel drive shafts and mechanism for controlling each of said brake bands independently of the other whereby power from said engine may be transmitted to one or the other of said wheels to cause the machine to turn on either wheel as the center or on a center intermediate the wheels, and means connecting the opposite units of planetary transmission gearing to cause the units to rotate in unison.

In testimony whereof I affix my signature.

DANIEL C. DRILL.